United States Patent
Faris et al.

(10) Patent No.: US 9,418,141 B2
(45) Date of Patent: Aug. 16, 2016

(54) SYSTEMS AND METHODS FOR PROVIDING A MULTI-FUNCTION SEARCH BOX FOR CREATING WORD PAGES

(75) Inventors: Andrew Boath Faris, Venice, CA (US); Anthony Dominic Amidei, Santa Monica, CA (US); Joshua Allen Rehling, Santa Monica, CA (US); Stephen Garcia, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1190 days.

(21) Appl. No.: 11/836,719

(22) Filed: Aug. 9, 2007

(65) Prior Publication Data

US 2009/0043737 A1 Feb. 12, 2009

(51) Int. Cl.
*G06F 17/30* (2006.01)

(52) U.S. Cl.
CPC .... *G06F 17/30643* (2013.01); *G06F 17/30864* (2013.01)

(58) Field of Classification Search
CPC .............. G06F 17/30643; G06F 17/30864
USPC ........................................... 707/769
See application file for complete search history.

(56) References Cited

U.S. PATENT DOCUMENTS

| | | | | |
|---|---|---|---|---|
| 7,844,599 | B2 * | 11/2010 | Kasperski et al. | 707/713 |
| 2002/0147709 | A1 * | 10/2002 | Rajarajan et al. | 707/3 |
| 2003/0037050 | A1 * | 2/2003 | Monteverde | 707/6 |
| 2003/0050863 | A1 * | 3/2003 | Radwin | 705/27 |
| 2004/0111467 | A1 * | 6/2004 | Willis | 709/203 |
| 2006/0015480 | A1 * | 1/2006 | Conahan | G06F 17/30867 |
| 2006/0248078 | A1 * | 11/2006 | Gross et al. | 707/5 |
| 2007/0060114 | A1 * | 3/2007 | Ramer et al. | 455/418 |
| 2008/0214149 | A1 * | 9/2008 | Ramer et al. | 455/414.1 |

* cited by examiner

*Primary Examiner* — Mahesh Dwivedi
*Assistant Examiner* — Johnese Johnson
(74) *Attorney, Agent, or Firm* — Martine Penilla Group, LLP

(57) ABSTRACT

A multi-function search box on a word page is provided to enable a user to enter a word. The multi-function search box includes a text input control to provide text input functionality. The text input control is capable of suggesting a complete word based on a partially entered word. A dropdown display area is provided in the multi-function search box to display a list of words, every word therein contextually related to the fully entered or partially entered word. Another dropdown display area is provided to display contextually related options for a selected word in the list of contextually related words.

24 Claims, 6 Drawing Sheets

SYSTEMS AND METHODS FOR PROVIDING A MULTI-FUNCTION SEARCH BOX FOR CREATING WORD PAGES

CROSS REFERENCE TO RELATED APPLICATIONS

This Application is related to co-pending: (1) patent application Ser. No. 11/836,724, filed on Aug. 9, 2007, entitled "Systems and Methods for Dynamic Page Creation", (2) patent application Ser. No. 11/836,723, filed on Aug. 9, 2007, entitled "Systems and Methods for Comments Aggregation and Carryover in Word Pages", (3) patent application Ser. No. 11/836,721, filed on Aug. 9, 2007, entitled "Systems and Methods for Providing Enhanced content Portability in a Word Page Module", and, (4) patent application Ser. No. 11/836,717, filed on Aug. 9, 2007, entitled "Systems and Methods for Providing a Persistent Navigation Bar in a Word Page", each of which is incorporated herein by reference.

FIELD OF THE INVENTION

This invention generally relates to displaying information related to a given word. More specifically but without limitation, this invention relates to displaying a list of words and categories of content that are contextually related to a user entered word and generating a web page that is focused around a selected word or category from the list of words. The information in the word page is presented and organized to optimize user interactivity with the web page.

BACKGROUND OF THE INVENTION

The computing industry has seen many advances in recent years, and such advances have produced a multitude products and services. Internet websites are examples of products and services, which are created to give users access to particular types of services, data, or searching capabilities. Today, websites can be readily created by most individuals desiring to post information or provide access or connectivity to other data. Websites are also created, updated, and supported to provide constantly updated current event information, news, and other information. This data is highly managed and processed so that its presentation can be easily displayed on web browsers or other Internet connected devices.

Currently to date, however, the traditional web sites provide mostly unstructured and contextually unrelated information to a user. For example, when a phrase is searched, resulting web page typically displays many links to external websites. These links to external websites are typically selected to be displayed on the web page based on phrase matching criteria without any consideration for user interactivity and/or contextual relationship with the searched phrase. Generally, the user is forced to visit many external websites associated with presented links to find more information about the searched phrase.

Moreover, when the user is entering a phrase to begin a search, generally, little to no assistance or suggestion is provided to help the user complete a contextually connected phrase. And, if help or a suggestion is provided, the help or suggestion is based on word match only rather than providing an intelligent suggestion including contextually related information about the entered word.

It is within this context that embodiments of the invention arise.

SUMMARY OF INVENTION

Broadly speaking, the present invention fills these needs by providing a modular system that enables users to enter a word or to select a word from a list of dynamically generated and contextually related words.

In one example, the list of contextually related words is generated from a multi-function search box, based on user entered words and may be continuously updated as the user continues entering each letter of the entered word. Unlike what is presently available (e.g. a list of suggest words based on phrase or letter matching, without any regard for context of the entered phrase), the embodiments of present invention present a list of contextually related words. In one embodiment, the list of words also presents suggested categories of content that are contextually related to the user entered word. One embodiment of the present invention enables generation and presentation of content related to one or more content types related to the user entered word or to the selected word. The content types are defined herein to be "vertical types." A vertical type may define a specific type of media content, such as movies, music, pictures, games, videos, gossip, etc. Each of the vertical types, in one embodiment, is presented in a page module. If more than one vertical type is presented in response to the entered, then a webpage is created with two or more page modules, and each page module may include the latest content for that vertical. Each vertical can then be navigated by users, and users can further define different views or arrangements of the content in each module, based on the received navigation of the user. Furthermore, the "word" query, when entered by the user (e.g., through a multi-function search box, or other functional interface), will define contextually related words, that can also cause the generation of new modules for the webpage. The resulting web page is therefore dynamically generated and created, as opposed to separate visits to disparate web pages that are pre-defined or constructed for conventional searching and navigation. Consequently, all searching and navigation occurs from within the webpage of page modules, thus eliminating the need to perform external web searching. Further yet, the dynamic generation and arrangement of page modules can be triggered by user defined search words. If the entered word is identified with some contextual category or categories, the word is used to dynamically define a context. The context is thus used to define the type of content that will be presented in the page modules that will define the dynamically generated webpage.

Furthermore, because the user is not guided properly through a display of contextually related words and categories of content to help the user explore interesting content, the user would feel disconnected with the content browsing experience, and may get exhausted from pointless information browsing during their search for more contextually related or connected information. Hence, there is a need for methods and systems that enable users to browse contextually related words and categories of content and generate websites that intelligently obtain content either directly or contextually to the entered or selected word, for a seamless presentation to users, and to make the users more connected with the browsing experience.

In one embodiment, a multi-function search box on a word page is provided to enable a user to enter a word. The multi-function search box includes a text input control to provide text input functionality. The text input control is capable of suggesting a complete word based on a partially entered word. A dropdown display area is provided in the multi-function search box or entry field to display a list of words each contextually related to the fully entered or partially entered word. Another display area is provided to display contextually related options for a selected word in the list of contextually related words.

In another embodiment, a computer-implemented method of generating a word page from a user entered word in a multi-function search box is disclosed. The user entered word is read from the multi-function search box and a subject context for the user entered word is determined. A plurality of page modules related to the user entered word by the subject context are searched and each of the plurality of page modules are displayed on a display screen.

In yet another embodiment, a computer-implemented method of monetization of a word page based on a user entered word in a multi-function search box is disclosed. In this method, the user entered word from the multi-function search box is read and a subject context for the user entered word is determined. A paid word for the user entered word by the subject context is retrieved. The paid word is related to the user entered word by advertisers.

The advantages of the present invention are numerous. Most notably, the system and apparatus described herein provide the newest and context related choices for a partially or fully user entered word including categories of content for the user entered word in the multi-function search box. The multi-function search box enables users to quickly find what they are interested in and then dive deeper into any of the page modules that are created through the entering or selecting a word in the multi-function search box.

Other aspects and advantages of the present invention will become apparent from the following detailed description, taken in conjunction with the accompanying drawings, illustrating by way of example the principles of the present invention.

BRIEF DESCRIPTION OF DRAWINGS

The present invention will be readily understood by the following detailed description in conjunction with the accompanying drawings. To facilitate this description, like reference numerals designate like structural elements.

Figure 1:
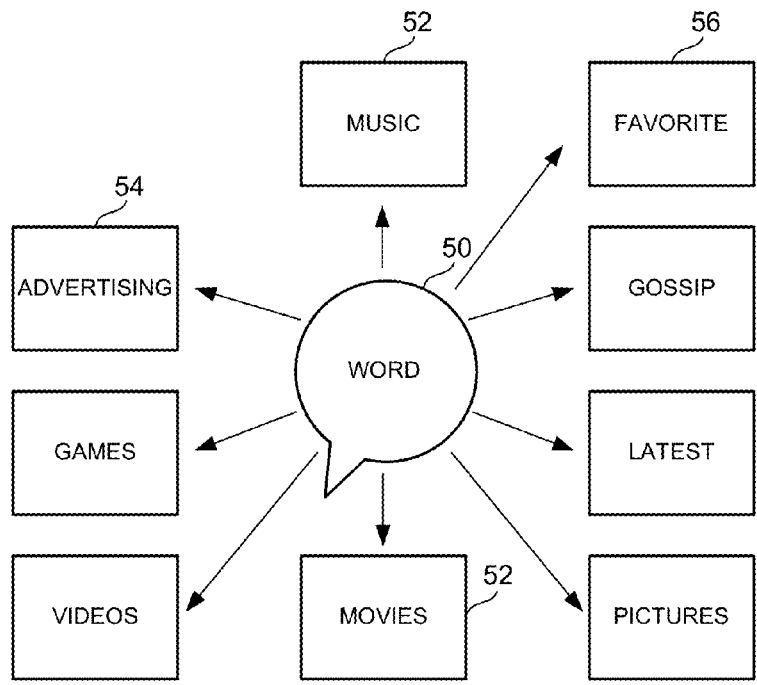
FIG. 1 illustrates a broad relationship between a word and different types of page modules, in accordance with one embodiment of the present invention.

The figures are provided in order to provide a thorough understanding of the present invention. The figures should not be construed as limiting the breath of the invention in any manner.

DETAILED DESCRIPTION

A system and apparatus for generating a list of words and categories of content that are contextually related to a partially or fully entered word in the multi-functional search box on a "word page" is disclosed. A "word page" includes page modules that present content having specific context. Context can be defined based on types of media, or categories with a type of media. In one embodiment, a "vertical" defines a type of media, such as music, movies, communication, shopping, gaming, etc. Within each vertical, further contextual categories can be defined. For instance, within music, a context can be defined for types of music, each artist, etc. Thus, for purposes of clarity, the degrees and granularity by which types of context can be broken up or organized can grow over time, as further context definitions are generated for words. The "word page", as used herein, is a web page, that is constructed from one or more page modules. The page modules, as noted above, will each define a type of content, such as movie related content, music related content, picture related content, game related content, video related content, gossip related content, etc. Although other interface control features can be used to enable word entry and analysis of an entered word for context, the example shown herein is a multi-function search box. The multi-function search box is used to enter or select a "word", and that word will be used to rearrange, construct or obtain contextually related content that will define the presentation, data, interactivity, images, etc., of specific page modules. Thus, the word page is a contained page, that dynamically changes, depending on the selected or entered word. A word page is therefore not a search engine or search interface that triggers a search of web links or external websites. To the contrary, the word page will contain or generate one or more page modules, and the data that is presented in each of the page modules dynamically changes or is updated over time or based on the entered "word" in the multi-function search box or the selection of specific "words" within a particular page module of the word page.

As used herein, to be "contextually related" means that a particular word, that may be entered by a user is related to other words or phrases. Other words or phrases may be related in terms of context, and the context means that there is some weaving together of words, in terms of meaning, subject, or a combination thereof. Thus, words that are contextually related to other words or phrases may be connected in terms of coherence. Still further, context can be thought of in terms of parts of a discourse that surround a word or passage and can throw light on the meaning of the entered word. Some words, that are considered contextually related may be defined based on some descriptive interrelation, dependence, or condition, based on a theme, environment, setting, event, group of similar media, similar activities, or combinations thereof.

In one example, information retrieved for a user entered or selected word in the multi-function search box is displayed in different types of page modules. For example, music related content is displayed in a music module; gossip related content is displayed in a gossip module, and so on. Various types of standard page modules are provided to display a set of popular content types. Unlike traditional search engines that provide links to possible information about a searched phrase, a web page (e.g., word page) is created for the entered word, as defined in one embodiment. Furthermore, the created word page provides content in a user friendly manner, as opposed to providing raw links to external web sites or web resources. Moreover, unlike traditional search engines that present links leading to possible unrelated information about a phrase, the word page hosts information either directly or contextually related to the entered word.

The multi-function search box has numerous functions. In one example, the multi-function search box generates a list of words that are either directly or contextually related to the user entered word. The list of words is generated and updated continuously as the user proceeds to enter each letter of the user entered word in the multi-function search box. The multi-function search box also suggests one or more complete words for a partially entered word in the multi-function search box. In another example, the multi-function search box generates a list of content categories for a user entered word. Each category in the list of content categories is contextually related to the user entered word. In one embodiment, the list of content categories is generated only if the entered word is an abstract word. In yet another example, the multi-function search box generates both the list of words and the list of content categories that are contextually related to the user entered word and both lists are displayed by the multi-function search box.

In one embodiment, content of the multi-function search box are rearranged of updated based on user interactivity with the content of the multi-function search box and page modules in the word page. For example, if a user shows relatively greater interest in a particular type of content (such as games, movies, etc.), the content related to these particular types of content are elevated in the list of words and categories that are displayed by the multi-function search box in response to the user entered word.

With this overview in mind, the following figures will illustrate example structure and functionality of the multi-function search box in word pages.

FIG. 1 illustrates a word 50 and various broad types of page modules 52, sponsored modules 54, and, favorite module 56. Word 50 relates to a concept, person, brand, etc and functions as a carrier of meaning. In one embodiment, the page modules 52 are categorized by a specific type of content type such as music, movie, gossip, latest, etc. New content types may be added to create a new page module 52. The sponsored module 54 is a special type of module that is provided or built specifically to host selected sponsored content associated with a particular word 50.

In one embodiment, the favorite module 56 is a special type of page module that is used for storing pointers or references to page modules 52 that were previously marked as "favorite". In another embodiment, various user defined content or links to external resources, media, movie clips, albums, etc. may also be stored in the favorite module 56. In yet another embodiment, the favorite module 56 contains content specific to a particular user. Such content is added to the favorite module 56 through user action. In yet another embodiment, one or more page modules 52 are generated for the entered word 50 "favorite". The page modules 52 that are generated for the entered word 50 "favorite" contain user's favorite content in one or more vertical category such as music, movies, events, etc. User's favorite content in one embodiment is based on the logged in user's profile information including at least one of user's preferences, age, sexual orientation, geographical location. In another embodiment, if the user has not logged in, user's content browsing pattern and interactivity with the page modules is stored in cookies or temporary files which are then used to generate or assemble user's favorite content in various vertical content categories. In yet another embodiment, the generation of user's favorite content is based on a combination of user profile information and user's interactivity with the page modules 52 during one or more prior word website browsing sessions.

As illustrated in FIG. 1, word 50 surrounded by page modules 52, sponsored modules 54, and favorite module 56, signifies that a quest for information related to the word 50 leads to generation of various types of page modules 52 and sponsored modules 54, each hosting a specific type of content. FIG. 1 further illustrates that generation of the word page revolves around selection of the word 50, i.e. information displayed through various page modules 52 is focused on the selected word 50. For example, selecting "popular" for word 50 will generate a word page with the most popular content for each respective page module (such as popular movie, popular music, popular celebrity, popular fashion, popular club, etc.). A new word page including a different set of page modules 52, is generated every time a new word 50 is selected. Hence, in above example, when the selection changes from "popular" to "newest", a new word page including page modules 52 such as "newest movies", "newest music album", "newest car models", etc. will be generated.

In one embodiment, the system maintains a list of words 50 and a list of appropriate page modules 52 for various types of content related to each of the words 50 in the list. In one embodiment, words 50 and page modules 52 are maintained and updated by the information editors with the help of user's browsing patterns, latest stories about various celebrities, products, etc., various topics that users may be interested in, the latest news, etc. Content are grouped in different categories such as content related to a particular subject or word suitable or liked to a particular segment of users. In one embodiment, contents are regularly and continuously updated to keep up with the latest developments. In another embodiment, various types of contents are scanned and obtained from various electronic media sources automatically, based on context based search filters.

Figure 2:
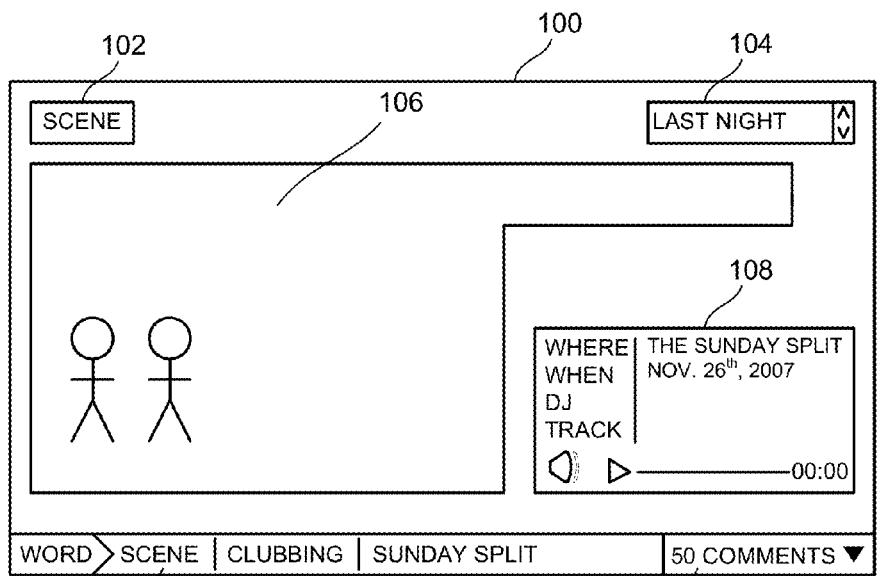
FIG. 2 illustrates a page module layout showing various placeholders of a page module, in accordance with one embodiment of the present invention.

FIG. 2 illustrates a page module layout 100. In one embodiment, the page module layout 100 includes a title 102, a filter 104, a interactive media space 106, a media metadata placeholder 108, a word bar 110, and a comments control 112. The page module layout 100 is capable of being modified to accommodate different types of content. For example, media metadata placeholder 108 may be made invisible to enable interactive media space 106 to be used for a full screen media display. In another example, interactive media space 106 may be broken up into two or more media spaces for showing multiple media content simultaneously or side-by-side. In yet another example, a section of interactive media space 106 may be used for playing a video while other sections may be used for displaying thumbnail pointers to other media content.

The title 102 is used to display a title of content of a page module 52, sponsored module 54, or, favorite module 56. Text displayed in the title 102 is also a word 52, i.e. the title is selectable by a user and such selection would also triggers a generation of a new word page focused around the word 50 in the title 102. In one embodiment, some of the commonly used titles are music, movie, latest, gossip, etc. Title 102 is generally a topic name of content in the page module 52. For example, a page module 52 with title 102 text "music" will have contents either directly or contextually related to music.

Still referring to FIG. 2, because title 102 is also a word 50 that has its own context around it, selecting the title 102 will generate a new word page to display various page modules 52 centered or focused around the word. For example, in a word page focused around word 50 "Lindsay Lohan" that contains a module named "Music" (i.e. "Music" is the title 102 of the page module 52) featuring the music of "Lindsay Lohan", selecting (or clicking) on the title 102 of "Music" page module 52 would cause generation of a new word page now focused at music. This new word page will, for instance, have page modules 52 focused at classical music, newest music album, heavy metal, jazz, etc., all centered around and focused at "Music". Thus, as used herein, a word does not have to be a single word, but can be a set of words to define a person, place or thing. A word, however, is different than a phrase which may be in the form of a sentence. Therefore, broadly speaking, a word can be a single word or tight collection of words that convey context.

Thus, cyclic generation of word pages that include only contextually relevant and highly focused information provide a higher degree of browsing experience because the user is not forced to jump from one website to another website in search of relevant content.

In one embodiment, the word bar 110 is provided to display other words 50 related to the subject matter of the page module 52. Word bar 110 may include words 50 that are contextually related to the subject matter of content of the page module 52. For example, the word bar 110 in a scene module may contain words 50 "Clubbing", "Sunday Split", etc. because these words 50 are contextually related to the topic of page module 52.

In one embodiment, the word bar 110 may also contain one or more sponsored words 50. Sponsored words 50 are bought (or paid for) by advertisers and can be displayed in the word bar 110 when a specified sponsoring criteria is met. In another embodiment, the system identifies a sponsored word to be included in the word bar 110 based on the user interest in a particular type of subject matter, user's past browsing history, user's like for a particular brand, etc. Selecting a word 50 in the word bar 110 will generate a new word page to display page modules 52 and optionally sponsored modules 54 centered around and focused on the word 50 selected through the word bar 110. Hence, in this embodiment, if a word page is generated around the word 50 "Celebrity" in which a page module named "Music" is displayed, the word 50 "N-Sync" would appear in the word bar 110. Selecting (or clicking) the word 50 "N-Sync" in the word bar 110 will cause generation of a new word page. This new word page will, for instance, have page modules 52 such as Music, Latest, Gossip, etc., all centered or focused around the word "N-Sync".

In one embodiment, a word bar 110 can be used for targeted advertising campaigns. For example, the marketer of the brand Pepsi™, through a advertising relationship, relates the word "N-Sync" with the word "Pepsi". Hence, in a word page centered around word 50 "N-Sync" that includes a "Latest" page module 52, word bar 110 in the "Latest" page module 52 may include a word 50 "Pepsi". Selecting word "Pepsi" on the word bar 110 would generate a new page focused on brand "Pepsi" and including content provided or specified by the advertiser. In one example, this sponsored content also includes content that is unrelated to the sponsored brand (e.g. a word page focused on "Pepsi" may include page modules 52 to enable presentation of clips from the latest movies or latest music albums).

In order to make sponsored content unobtrusive, factors such as visual appeal, motion, and, minimal contribution to clutter, etc. are considered. Hence, at a first glance of the word page, advertising seems to be missing, but when a user interacts with any of page modules 52, sponsored content are intermixed with content of page modules 52. In one embodiment, this mixing of sponsored content with content of page modules 52 is done without jeopardizing contextual relationship of the entered word 50 with content of page modules 52.

In one embodiment, comments control 112 has two states i.e. a closed state and an expanded state. In closed state, comments control 112 shows a number referring to a number of comments written by the users for a page module 52 that includes a particular type of content focused on a particular word 50. Comments control 112 may be expanded by selecting or clicking on the word. In the expanded form, comments control 112 displays a full text of comments and replies to these comments. In one embodiment, a comment may be replied, a reply to a comment may be replied, and so on. The comments and replies are laid out for easy identification between a comment and a reply.

A comment or a reply or a reply to a reply may be in textual form, an audio form, or in an audio visual or audio-video form. The expanded view of comments control 112 provides functionality to control the audio and visual aspects of audio or audio-visual comments through volume and video controls provided therein.

Figure 3:
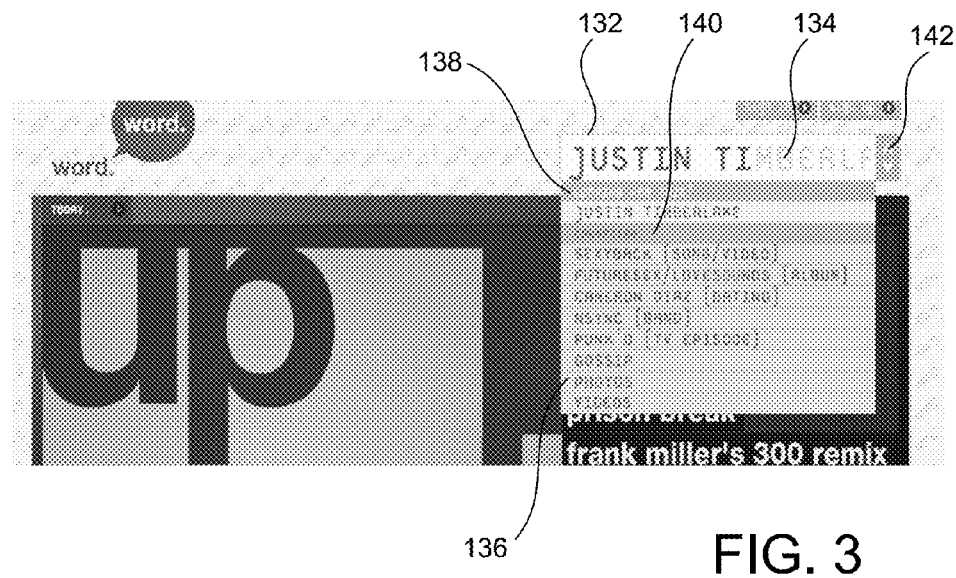
FIG. 3 illustrates structure of the multi-function search box, in accordance with one embodiment of the present invention.

Referring now to FIG. 3, which illustrates a multi-function search box 132 in a word page. The multi-function search box 132 includes a text edit control 134 to enable the entering of a word. The text edit control 134 is coupled with a local or remote database or data store to quickly find out one or more possible completed words as letters of a word are entered in the text edit control 134. A scroll control 142 is provided to enable scrolling among all suggested words for an unfinished entered word 50 in the text edit box 134. In one embodiment, the scroll control 142 is also used to open a dropdown display area 136 to display suggested and related words and categories of content for an entered word 50.

Still referring to FIG. 3, in one embodiment, the dropdown display area 136 is divided into two sections, a first section 138 and a second section 140. The first section 138 displays one or more suggested words for a partially entered word or a misspelled word in the text edit box 134. These suggested words, in one embodiment, are defined for a type of context. The second section 140, in one example, displays a list words that are contextually related to the user entered word. The second section 140, in another example, displays a combination of contextually related words and content categories. For example, the first section 138 may display the word 50 "Justin Timberlake" and the second section 140 may display the words "SEXYBACK" (song/video by Justin Timberlake), "CAMERON DIAZ" (dating Justin Timberlake), "NSYNC" (Justin's band), "PHOTOS" ( . . . of or related to Justin Timberlake), "VIDEOS" ( . . . of or related to Justin Timberlake), etc. In this example, words such as "SEXYBACK" and "CAMERON DIAZ" are words that are contextually related to the entered word 50. Furthermore, words such as "PHOTOS" and "VIDEOS" are categories of content that related to the entered word 50.

Still referring to FIG. 3, in one embodiment, the multi-function search box 132 uses adaptive personalization process to display the content of the dropdown display area based on user interactivity with the words 50 and the content generated for these words in the word pages. The user interactivity, in one embodiment, also considers user's interest or a lack thereof in particular types of content. For example, if a particular user seldom views photos in the word page or seldom selects this category in the dropdown display area 136, the multi-function search box 132 may push "photos" category down in the list, or remove it altogether. In another embodiment, the adaptive personalization process considers user's age, gender, demographic location, education level, etc. to select content of the dropdown display area 136.

Figure 4:
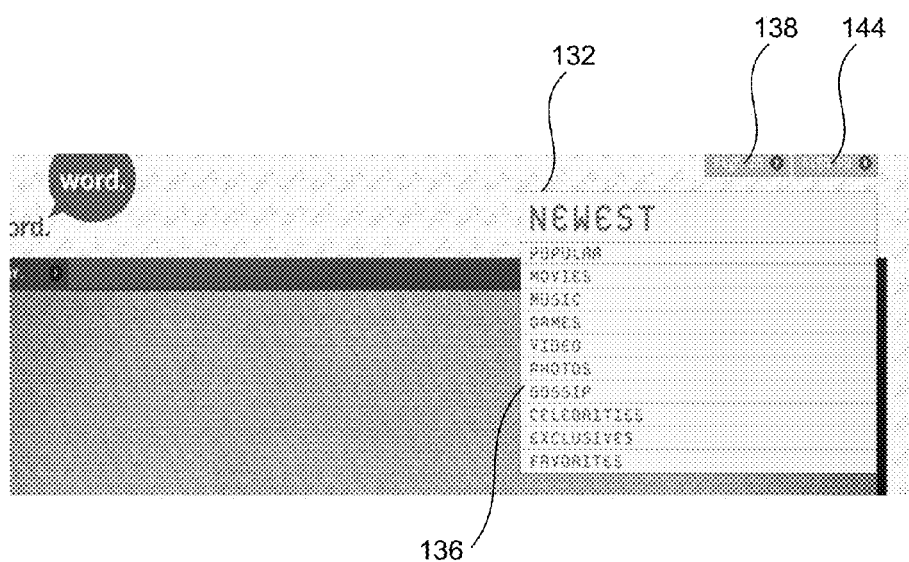
FIG. 4 illustrates a multi-function search box showing the categories of content that is contextually related to the entered word, in accordance with one embodiment of the present invention.

FIG. 4 illustrates the multi-function search box 132 in another embodiment. The multi-function search box 132 is capable of identifying whether the entered word is an abstract word. In that case, the dropdown display area 136 displays only categories of content that are contextually relevant to the entered word 50. The multi-function search box 132 also uses the adoptive personalization process as describes in the description of the FIG. 3, in displaying the list of categories of content.

Still referring to FIG. 4, the word page provides "sign in" 138 and "sign up" 144 controls to enable users to log in or register with the website for the first time (or at a later visit), respectively. One of the purposes of enabling users to sign in is to allow the adoptive personalization engine to collect data related to users' browsing pattern, interests, age, gender, education level, demographic, location, etc. In one embodiment, a cookie store is used to track and record browsing patterns on a particular computer system. In yet another embodiment, both cookie tracking and sign in process is used by the adoptive personalization process to tailor content of the page modules to the interests of the users.

Figure 5:
FIG. 5 illustrates a multi-functional search box showing the categories of content that is contextually related to the entered word and a preview of the latest content in a page module, in accordance with one embodiment of the present invention.

FIG. 5 illustrates the multi-function search box 132 in one embodiment. In this embodiment, when the multi-function search box 132 displays a list of suggest words or categories of content that are related to the entered word 50, the word page is also updated to show a preview of content related to one or more categories of the entered word. For example, when user enters "newest" in the multi-function search box 132, multi-function search box 132 recognizes this entered word as an abstract word and display a list of categories of content contextually related to this entered word. The word page is also modified to show a preview of movie "Prison Break" and other newest content in one or more displayed categories of content. One of the purposes of this preview is to help the user in making a decision as to what category or word the user should choose.

Figure 6:
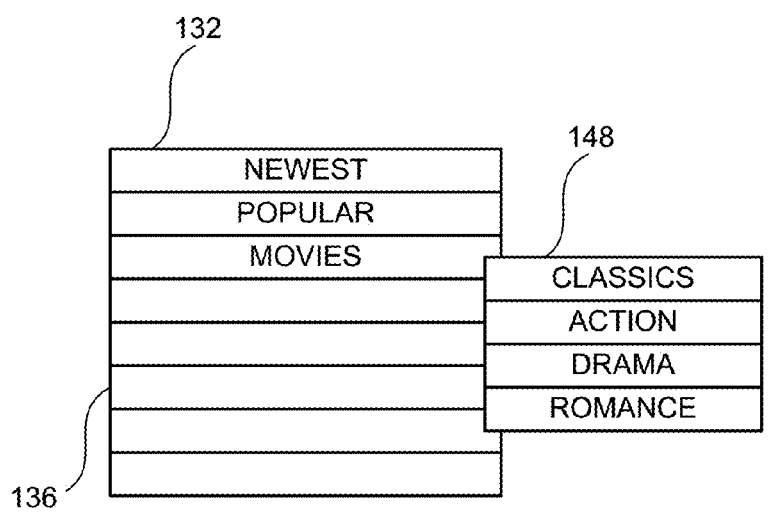
FIG. 6 illustrates a list of words representing sub-categories of a selected category or word in the multi-function search box, in accordance with one embodiment of the present invention.

FIG. 6 illustrates an option display area 148 that is attached to the dropdown display area 136. In one embodiment, the option display area 148 is used to display filter options for a selected item in the dropdown display area 136. For example, if the category "movies" is selected in the dropdown display area 136, the option display area 148 would show entries such as "classics", "action", "drama", "romance", etc. all referring to a type of movies. Hence, the user would be able to filter down to a category of movies of user's choice using the option display area 148. In another example, if a word "NSYNC" is selected in the dropdown display area 136, the option display area 148 may display choices such as "latest album", "most popular", etc.

Still referring to FIG. 6, in one embodiment, various filter options for a selected word or category in the dropdown display area 136 are retrieved from one or more connected databases or one or more configured external sources of such information. In one embodiment, these filter options for each word and category are maintained manually by information editors. In another embodiment, the filter options are assembled automatically from the information contained in one or more connected databases or other types of information sources, with the use of one or more computer implemented filtering logic.

Figure 7A:
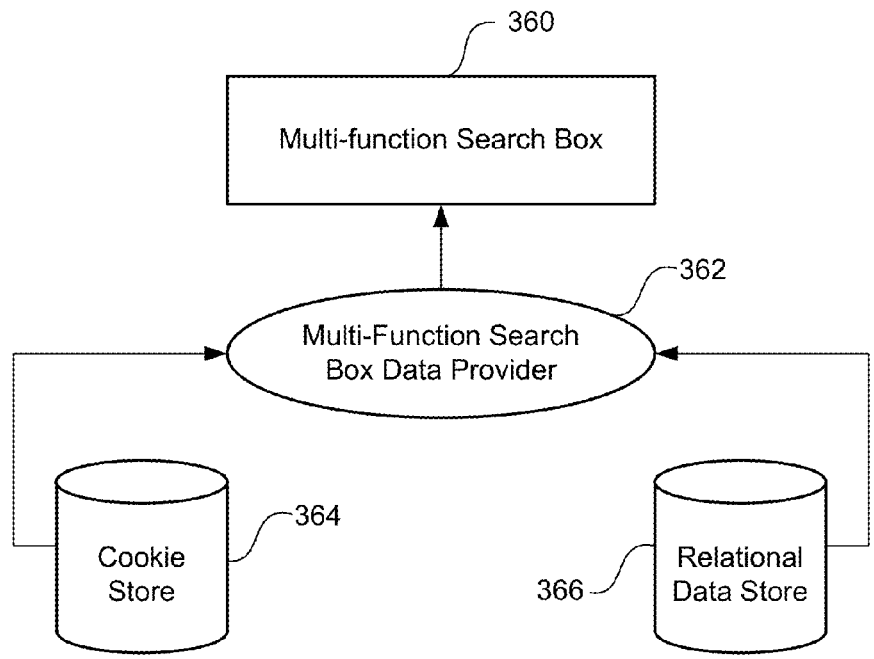
FIGS. 7A and 7B illustrate a system diagram to show a relational database for storing words and their direct and contextually relationships with the contents, in accordance with one embodiment of the present invention
Figure 7B:
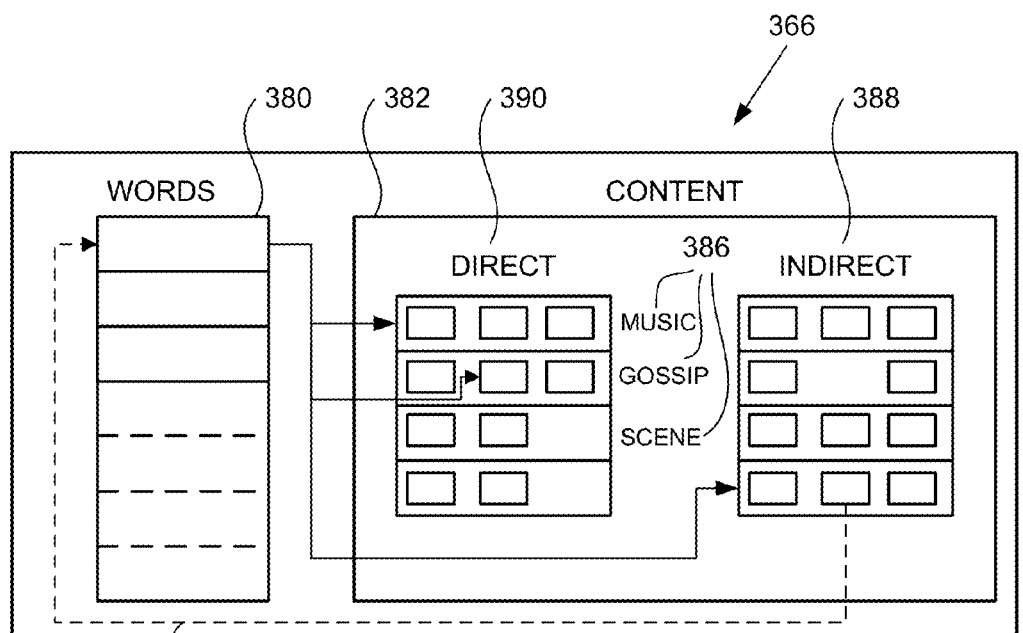

FIGS. 7A and 7B illustrate an apparatus for generating a list of words or categories of content that are contextually related to the entered word in the multi-function search box. The apparatus also triggers generation of a word page based on an entered word. In one embodiment, contextual relationships are maintained in a relational database 366, which stores words 50, content, and relationships between the words and content. FIG. 7A illustrates that the apparatus for generating a list of words or categories of content that are contextually related to the entered word in the multi-function search box 360 include a multi-function search box data provider 362 to interact with databases and other content sources for the purpose of assembling information related to entered word 50. In one embodiment, the multi-function search box data provider 362 also interact with a cookie store 364 to retrieve user interactivity and other information to keep track of browsing behavior, preferences, etc. In one embodiment, the multi-function search box data provider 362 uses the cookie store 364 to generate the list of words or categories in the multi-function search box tailored to user's browsing behavior.

FIG. 7B illustrates a database semantic in one embodiment. A relational database 366 is employed to store a list of words 380 and content 382. Content 382 include directly related content 390 and indirectly/contextually related content 388. An association of entries in the word list and directly related content 390 is also maintained in the relational database 366. An association 384 of entries in the word list 380 is also maintained with indirectly/contextually related content 388. Both directly related content and indirectly/contextually related content include text, media, comments, etc. In one embodiment, one or more relational databases are employed. In another embodiment, a combination of various types of data stores such a relational databases, object databases, active directory server, LDAP server, etc. may be employed.

Figure 8:
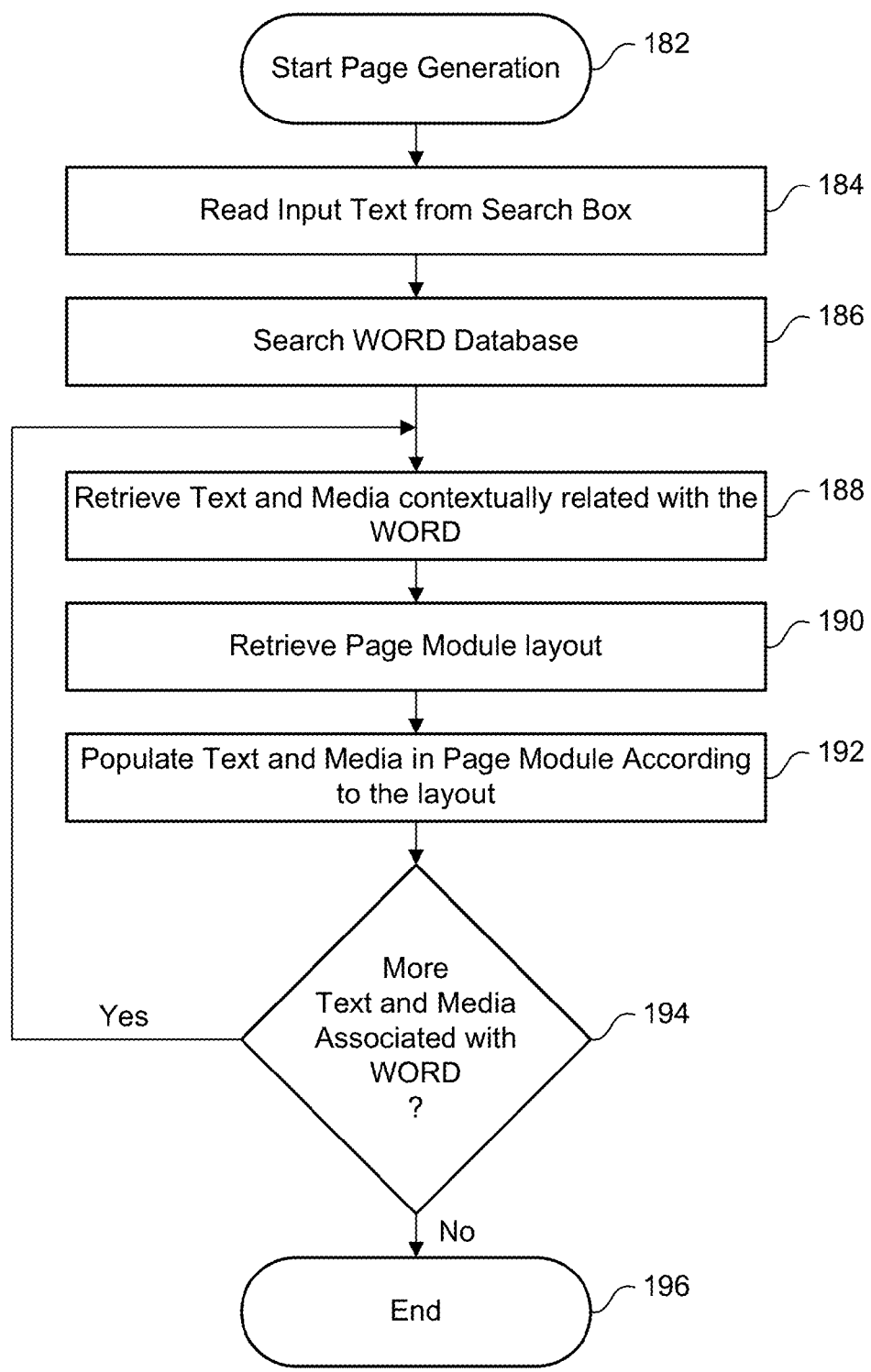
FIG. 8 illustrates a flow diagram of the word page generation process for the entered word in the multi-function search box, in accordance with one embodiment of the present invention.

FIG. 8 illustrates a flow diagram illustrating a process of generating a word page 180 in one embodiment. In this embodiment, the word page generation process starts 182 by reading the entered word from the multi-function search box 184. A search is conducted 186 for entered word 50 in a database. As illustrated in FIGS. 7A and 7B, a list of words 50 along with directly and contextually related content, including text and media, are stored in one or more databases. In one embodiment, one or more relational databases are employed. In another embodiment, a combination of various types of data stores such a relational databases, object databases, active directory server, LDAP server, etc. may be employed.

In one embodiment, the database or a group of databases contains all content necessary to generate a word page from an entered word 50. In another embodiment, database or a group of databases may contain links or references to external sources from where information may be retrieved and formatted for displaying in page modules 52, and sponsored modules 54. Comments (and replies to comments) related to specific objects (such as a picture, part of the picture, a video, a quote, an event, etc.) on page modules 52 and sponsored modules 54 are also stored in databases along with a relationship of a comment to an object to which the comment relates.

Text and media directly and contextually related to the entered word 50 is retrieved 188 from the database or a group of databases. A media includes movies, videos, audios, audio-video, still pictures, or any other type of non-textually visual presentations. Based on the type of media and text, a page module layout 100 based on the subject matter of the retrieved data is identified 190. The page module layout 100 is populated with the retrieved text and media 192 to form a specific type of page module 52 or sponsored module 54. The system continues looking for relevant data to generate page modules 52 in the word page 194. Generation of word page ends when system no longer finds contextually relevant data in the database or in the group of databases, or in one or more external sources.

In one embodiment, when database does not contain content related to entered word 50, the system tries to retrieve relevant information from a configured set of external sources through one of more commercially available internet search engines such as Yahoo™ Search.

Figure 9:
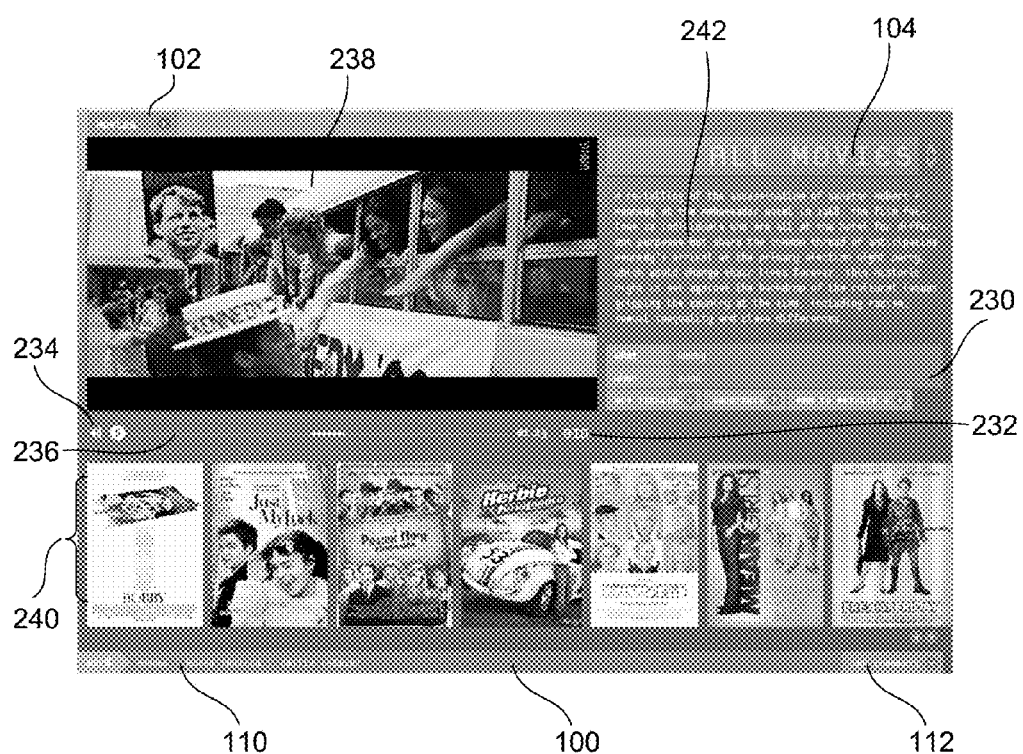
FIG. 9 illustrates a movie page module, in accordance with one embodiment of the present invention.

FIG. 9 illustrates an exemplary movie page module 100. In one example, when the user selects "movies" category for "newest" entered word in the multi-function search box 132, a word page including a movie page module 100 is generated. The movie page module 100 includes a module title 102 "movies", a filter 104 to select particular types of movies, a display area 242 to display information regarding a selected movie being previewed in a media box 238. A movie information box 230 displays other metadata information about the movie (such as year of make, etc.). A thumbnail strip 240 displays small thumbnails of movie pictures. The user may select any of these thumbnails to preview the corresponding movie. A "BIG" button 232 is provided to view the movie clip in a full screen mode (i.e. the media box 238 takes the entire area of the movie page module 100). An audio control 234 and media control 236 has been provided to enable the user to control the audio and video respectively. A word bar 110 is included to display contextually related words, which if selected would force a regeneration of the word page focused around the selected word. A comment control 112 is provided to enable entry or review of comments related to the content in this movie page module 100.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules, page modules, and, subsystems described in this document can be implemented using a programming language such as Flash, JAVA, C++, C, C#, Visual Basic, JAVA Script, PHP, XML, HTML etc., or a combination of programming languages. Commonly available application programming interface (API) such as HTTP API, XML API and parsers etc. are used in the implementation of the programming modules. As would be known to those skilled in the art that the components and functionality described above and elsewhere in this document may be implemented on any desktop operating system which provides a support for a display screen, such as different versions of Microsoft Windows, Apple Mac, Unix/X-Windows, Linux etc. using any programming language suitable for desktop software development.

The programming modules and ancillary software components, including configuration file or files, along with setup files required for installing the widget dock and related functionality as described in this document, are stored on a computer readable medium. Any computer medium such as a flash drive, a CD-ROM disk, an optical disk, a floppy disk, a hard drive, a shared drive, and an storage suitable for providing downloads from connected computers, could be used for storing the programming modules and ancillary software components. It would be known to a person skilled in the art that any storage medium could be used for storing these software components so long as the storage medium can be read by a computer system.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While this invention has been described in terms of several preferable embodiments, it will be appreciated that those skilled in the art upon reading the specifications and studying the drawings will realize various alternation, additions, permutations and equivalents thereof. It is therefore intended that the present invention includes all such alterations, additions, permutations, and equivalents as fall within the true spirit and scope of the invention.

What is claimed is:

1. A multi-function search box for display on a screen, comprising:
   a text input control to provide text input functionality, wherein the text input control suggests a complete word based on a partially entered word as a user continues entering characters of the user entered word, and
   a dropdown display area under and adjacent to the text input control, wherein the dropdown display area is opened upon detected entry in the text input control, the dropdown display area is divided into a first display area and a second display area, wherein,
      the first display area is oriented under the text input control to display a list of words, every word in the list of words is a suggestion for completing the user entered word; and
      the second display area coupled to and oriented under the first display area to display a list of contextually related options for a selected word in the list of words, wherein one or more of the contextually related options are generated without applying phrase matching criteria to the selected word, wherein a first displayed character of one or more of the contextually related options is exclusive of a first entered character of the user entered word, wherein the first or second display area is configured to receive a selection that is detected, wherein the detected selection is configured to trigger presentation of a page module including an interactive media space in a word page without generating links to external websites, wherein the page module is contextually related to the detected selection, wherein the multi-function search box is generated by a processor.

2. The multi-function search as recited in claim 1, wherein each of the contextually related options is contextually related to the user entered word when each of the contextually related options has descriptive interrelated connection to or from the user entered word.

3. The multi-function search box as recited in claim 1, wherein the complete word is suggested by the text input control based on a relative interest of the user in a particular subject matter as identified through interactivity of the user in content of the word page.

4. The multi-function search box as recited in claim 1, wherein the contextually related options define filters to narrow down a display of content of the word page to content that is contextually related to the user entered word in a selected category.

5. The multi-function search box as recited in claim 1, wherein the list of words in the first display area is updated as a subject context of the user entered word is changed.

6. The multi-function search box as recited in claim 1, wherein the first display area further comprising a plurality of groups, wherein each of the plurality of groups represents a group of related words in the first display area.

7. The multi-function search box as recited in claim 6, wherein each of the plurality of groups has a display title.

8. The multi-function search box as recited in claim 7, wherein the display title is displayed in the first display area.

9. The multi-function search box as recited in claim 1, wherein the contextually related options includes a plurality of word categories in the second display area.

10. The multi-function search box as recited in claim 9, wherein the second display area displays a plurality of word sub-categories for each of the plurality of word categories, wherein each of the contextually related options is assigned to one of multiple categories, wherein the categories include digital media, entertainment, images, music, videos, games, and advertisements.

11. The multi-function search box as recited in claim 1, wherein the list of words in the first display area is updated based on a user's interactivity with content of the multi-function search box.

12. The multi-function search box as recited in claim 1, wherein the list of words in the first display area is updated based on at least one of age, gender, education level, and geographical location.

13. The multi-function search box as recited in claim 1, wherein the dropdown display area is closed, upon detecting selection in either the first or second display area.

14. The multi-function search box as recited in claim 1, wherein the first display area is separated from the second display area by a bar area, wherein the bar area indicates that the contextually related options are contextually connected with the selected word.

15. The multi-function search box as recited in claim 1, wherein the page module includes a comments control, the comments control when selected displays a full text of comments and replies to the comments.

16. The multi-function search box as recited in claim 1, wherein the page module is capable of including a presentation of audio, video, text, and picture, wherein the page module includes an additional word that when selected results in a display of an additional word page, wherein the additional word page includes one or more additional page modules and is other than an external website, wherein the word page is other than an external website and is a web page, wherein the additional word page is a web page.

17. The multi-function search box as recited in claim 1, wherein each of the contextually related options is assigned to one of multiple categories, wherein the categories include digital media, entertainment, images, music, videos, games, and advertisements, wherein the page module includes an additional word that when selected results in a display of an additional word page, wherein the additional word page includes one or more additional page modules and is other than an external website, wherein the word page is other than an external website and is a web page, wherein the additional word page is a web page.

18. A computer-implemented method of generating a word page from a user entered word in a multi-function entry field, wherein the method is embodied within a computer-readable medium to be executed by a computer, the method comprising:

reading the user entered word from the multi-function entry field;

upon detecting entry of the user entered word in the multi-function entry field, opening a dropdown display area under and adjacent to the multi-function entry field, the dropdown display area is divided into a first display area and a second display area, wherein the first display area includes a plurality of words in the first display area, where every word in the plurality of words is a suggestion for completing the user entered word;

wherein the second display area is defined below the first display area to show a listing of information contextually related to selected one of the plurality of words, wherein one or more portions of the contextually related information are generated without applying phrase matching criteria to the selected one of the plurality of words, wherein each portion of the contextually related information defines a content category for the selected one of the plurality of words, wherein a first displayed character of one of the portions of the contextually related information is exclusive of a first entered character of the user entered word;

receiving a selection of the one of the portions of the contextually related information;

searching for a plurality of page modules of a set related to the one of the portions upon receiving the selection of the one of the portions, wherein said searching for the plurality of page modules is performed without searching for links to external websites, wherein one of the page modules includes an interactive media space, wherein the page modules of the set are contextually related to the one of the portions that is selected, wherein content of each of the page modules of the set has descriptive interrelated connection to the user entered word; and displaying each of the page modules of the set on a display screen.

19. The computer-implemented method as recited in claim 18, wherein the dropdown display area is closed, upon detecting selection in either the first or second display area.

20. A computer-implemented method of monetization of a word page based on a user entered word in a multi-function search box, wherein the method is embodied within a computer-readable medium to be executed by a computer, the method comprising:
- reading the user entered word from the multi-function search box;
- wherein upon reading the user entered word in the multi-function search box, opening a dropdown display area under and adjacent to the multi-function search box, the dropdown display area is divided into a first display area and a second display area,
- wherein the first display area is oriented under the multi-function search box to display a list of words, every word in the list of words is a suggestion for completing the user entered word, and the second display area is coupled to and oriented under the first display area to display a list of contextually related options for a selected word in the list of words, wherein each of the contextually related options are contextually related to the user entered word, wherein one or more of the contextually related options are generated without applying phrase matching criteria to the selected word, wherein one of the contextually related options includes a paid word sponsored for by an advertiser, wherein a first displayed character of the one or more of the contextually related options is exclusive of a first entered character of the user entered word; and
- searching for a plurality of page modules of a set that are contextually related to the selected word without searching for links to external websites, wherein one of the page modules includes an interactive media space, wherein content of every page module of the set has descriptive interrelated connection to the user entered word, wherein one of the page modules includes an advertiser sponsored module for the paid word.

21. The computer-implemented method as recited in claim 20, further comprising:
- displaying each of the page modules of the set in the word page.

22. The computer-implemented method as recited in claim 21, wherein the advertiser sponsored module includes a video advertisement.

23. The computer-implemented method as recited in claim 20, wherein searching for the page modules of the set includes searching for the page modules of the set related to the user entered word by a subject context for the user entered word, wherein the subject context defines a content category for the user entered word, the method further comprising:
- displaying each of the page modules of the set in the word page; and
- displaying the paid word in a word bar of the one of the page modules of the set.

24. The computer-implemented method as recited in claim 20, wherein the dropdown display area is closed, upon detecting selection in either the first or second display area.

* * * * *